United States Patent
Yang et al.

(10) Patent No.: US 11,618,937 B2
(45) Date of Patent: Apr. 4, 2023

(54) HIGH-MODULUS, HIGH-STRENGTH NODULAR IRON AND CRANKSHAFT

(71) Applicant: GM GLOBAL TECHNOLOGY OPERATIONS LLC, Detroit, MI (US)

(72) Inventors: Jianghuai Yang, Rochester Hills, MI (US); Qigui Wang, Rochester Hills, MI (US); Dale A. Gerard, Bloomfield Hills, MI (US); James D. Cremonesi, Rochester Hills, MI (US); Daniel J. Wilson, Linden, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 265 days.

(21) Appl. No.: 16/657,146

(22) Filed: Oct. 18, 2019

(65) Prior Publication Data
US 2021/0115540 A1 Apr. 22, 2021

(51) Int. Cl.
| | | |
|---|---|---|
| C22C 37/08 | (2006.01) | |
| F16C 3/06 | (2006.01) | |
| C22C 37/10 | (2006.01) | |

(52) U.S. Cl.
CPC .............. *C22C 37/08* (2013.01); *C22C 37/10* (2013.01); *F16C 3/06* (2013.01)

(58) Field of Classification Search
CPC ........... C23C 37/08; C23C 37/10; F16C 3/06; F16C 2202/06; F16C 2204/66; F16C 3/08
See application file for complete search history.

(56) References Cited

U.S. PATENT DOCUMENTS 3,411,957 A * 11/1968 Matsukura .............. C22C 37/10
148/544
2005/0194071 A1 9/2005 Takayama et al.
(Continued)

FOREIGN PATENT DOCUMENTS

| CN | 102177267 A | 9/2011 |
|---|---|---|
| CN | 104775067 A | 7/2015 |

(Continued)

OTHER PUBLICATIONS

Huang et al., CN 204729456, machine translation. (Year: 2015).*
(Continued)

*Primary Examiner* — John A Hevey
(74) *Attorney, Agent, or Firm* — Vivacqua Crane PLLC

(57) ABSTRACT

A nodular iron alloy and automotive components, such as a crankshaft, are provided. The nodular iron alloy may include iron, about 2.2-3.2 wt % carbon, about 1.7-2.3 wt % silicon, about 0.2-0.6 wt % manganese, a maximum of 0.03 wt % phosphorus, a maximum of 0.02 wt % sulfur, about 0.2-0.6 wt % copper, about 0.1-0.4 wt % chromium, about 0.4-0.8 wt % nickel, about 0.15-0.45 wt % molybdenum, about 0.2-1.0 wt % cobalt, about 0.02-0.06 wt % magnesium, and a maximum of 0.002 wt % rare earth element(s). The nodular iron alloy may have a Young's modulus in the range of 175-195 GPa and an as-cast ultimate tensile strength in the range of 750-950 MPa. This alloy possesses favorable strength, stiffness and noise/vibration/harshness qualities, making it suitable in crankshaft applications. A method of forming the nodular iron alloy includes feeding a magnesium-based material into a molten iron alloy through a continuous system at a constant amount.

14 Claims, 1 Drawing Sheet

(56) References Cited

U.S. PATENT DOCUMENTS

| | | | | |
|---|---|---|---|---|
| 2014/0093416 A1* | 4/2014 | Dekker | ................... | F01D 25/24 420/17 |
| 2017/0218488 A1* | 8/2017 | Anjiki | ..................... | C22C 37/04 |
| 2018/0216658 A1* | 8/2018 | Brown | .................... | F16C 7/023 |

FOREIGN PATENT DOCUMENTS

| | | | |
|---|---|---|---|
| CN | 204729456 U | * | 10/2015 |
| CN | 106715739 A | | 5/2017 |
| CN | 108624803 A | | 10/2018 |
| DE | 3628157 A1 | | 2/1988 |
| FR | 3025807 A1 | | 3/2016 |

OTHER PUBLICATIONS

U.S. Appl. No. 16/174,443, filed Oct. 30, 2018 by GM Global Technology Operations LLC, titled "High-Strength Nodular Iron with Good Weldability and Machinability."

U.S. Appl. No. 16/136,445, filed Sep. 20, 2018 by GM Global Technology Operations LLC, titled "As-Cast High Strength Nodular Iron With Favorable Machinability."

Founding, Spheroidal Graphite Cast Irons, EN 1563, Danish Standards Foundation, European Committee for Standardization, Ref. No. EN 1563:2011: E, 2011, Annex A.

Ductile Iron Data—Section 4, Ductile Iron Society, available at https://www.ductile.org/didata/Section4/4intro.htm, printed Sep. 20, 2018.

Ductile Iron Data—Section 5, Ductile Iron Society, available at https://www.ductile.org/didata/Section5/5intro.htm, printed Sep. 20, 2018.

Ductile Iron Data—Section 6, Ductile Iron Society, available at https://www.ductile.org/didata/Section6/6intro.htm, printed Sep. 20, 2018.

Ductile Iron Data—Section 12, Ductile Iron Society, available at https://www.ductile.org/didata/Section12/12intro.htm, printed Sep. 20, 2018.

Ductile Iron 65-45-12, Dura-Bar Metal Services, available at https://www.dura-barms.com/dura-bar/ductile-iron/65-45-12.cfm.

Standard Specifications for Ductile Iron Castings, ASTM International, Designation A536-84, Reapproved 2014.

Ductile Iron—ASTM A536 Ductile Iron, Farmers Copper, available at http://www.farmerscopper.com/ductile-iron.html, printed Sep. 21, 2018.

* cited by examiner

HIGH-MODULUS, HIGH-STRENGTH NODULAR IRON AND CRANKSHAFT

FIELD

The present disclosure relates generally to iron alloys, and more particularly, to iron alloys that are nodular and have a desired strength and modulus suitable for automotive components, such as crankshafts.

INTRODUCTION

A conventional crankshaft may be formed of an iron alloy having an ultimate tensile strength of about 550 MPa and a Young's Modulus of 150-165 GPa. Nodular iron alloys may be used for crankshafts to achieve strength requirements, but they can be difficult to machine and any machining that is performed produces unfavorable residual stress. In addition, nodular iron crankshafts may be the source of noise, vibration, and harshness issues due to low stiffness.

SUMMARY

This disclosure provides a new nodular iron alloy that has a high Young's Modulus and a high strength, which is suitable for crankshaft applications. The new nodular iron alloy may have, for example, an as-cast ultimate tensile strength in the range of 750-950 MPa and a Young's Modulus in the range of 175-195 GPa. The new nodular iron alloy allows advanced crankshaft designs to be created as-cast with hollow structure, which results in a reduced use of materials. The new nodular iron alloy may also provide for sufficient stiffness and low noise, vibration, and harshness.

In one example, which may be combined with or separate from the other examples and features provided herein, a nodular iron alloy is provided containing: iron; about 2.2 to about 3.2 weight percent carbon; about 1.7 to about 2.3 weight percent silicon; about 0.2 to about 0.6 weight percent manganese; about 0.2 to about 0.6 weight percent copper; about 0.1 to about 0.4 weight percent chromium; about 0.4 to about 0.8 weight percent nickel; about 0.15 to about 0.45 weight percent molybdenum; about 0.2 to about 1.0 weight percent cobalt; and about 0.02 to about 0.06 weight percent magnesium.

In another example, which may be combined with or separate from the other examples provided herein, a nodular iron alloy is provided that consists essentially of: about 2.2 to about 3.2 weight percent carbon; about 1.7 to about 2.3 weight percent silicon; about 0.2 to about 0.6 weight percent manganese; 0 to about 0.03 weight percent phosphorus; 0 to about 0.02 weight percent sulfur; about 0.2 to about 0.6 weight percent copper; about 0.1 to about 0.4 weight percent chromium; about 0.4 to about 0.8 weight percent nickel; about 0.15 to about 0.45 weight percent molybdenum; about 0.2 to about 1.0 weight percent cobalt; about 0.02 to about 0.06 weight percent magnesium; 0 to about 0.002 weight percent of one or more rare earth elements; and the balance iron.

Additional features may be provided, including but not limited to the following: wherein the iron is provided in an amount of at least 90 weight percent; the nodular iron alloy also including phosphorus in an amount not exceeding 0.03 weight percent; the nodular iron alloy also including sulfur in an amount not exceeding 0.02 weight percent; the nodular iron alloy also including one or more rare earth elements in an amount not exceeding 0.002 weight percent; wherein the nodular iron alloy has a Young's modulus in the range of 175 to 195 GPa; wherein the nodular iron alloy has an as-cast ultimate tensile strength in the range of 750 to 950 MPa; wherein the iron is present in an amount of greater than 90% of a pearlite microstructure; wherein the iron surrounds a plurality of graphite nodules; wherein a majority of the graphite nodules have a diameter in the range of 1 to 5 micrometers; wherein the nodular iron alloy has a nodularity greater than 85%; and wherein the plurality of graphite nodules have a number density of greater than 200 graphite nodules per square millimeter.

In one variation, the nodular iron alloy consists essentially of: about 2.2 weight percent carbon; about 2.2 weight percent silicon; about 0.3 weight percent manganese; about 0.02 weight percent phosphorus; about 0.001 weight percent sulfur; about 0.3 weight percent copper; about 0.2 weight percent chromium; about 0.5 weight percent nickel; about 0.3 weight percent molybdenum; about 0.5 weight percent cobalt; about 0.04 weight percent magnesium; about 0.001 weight percent of one or more rare earth elements; and the balance iron.

Any variation of the nodular iron alloy provided herein may be formed by a method that includes feeding a magnesium-based material into a molten iron alloy through a continuous system at a constant amount.

Further additional features may be included, including but not limited to the following: an automotive component being created from any variation of the nodular iron alloy; and the automotive component being a crankshaft.

The above features and advantages, and other features and advantages of the present disclosure, will be readily apparent from the following detailed description of the many aspects of the present disclosure when taken in connection with the accompanying drawings and appended claims.

BRIEF DESCRIPTION OF THE DRAWINGS

The drawings are provided for illustration purposes only and are not intended to limit this disclosure or the claims appended hereto.

DETAILED DESCRIPTION

Figure 1:
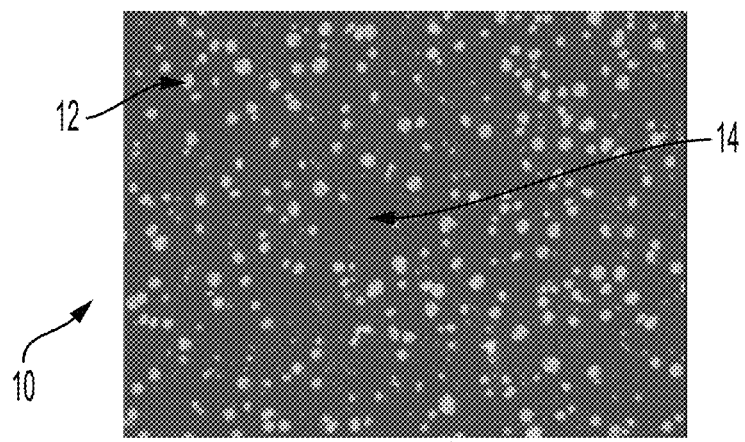
FIG. 1 is an enlarged view of a nodular iron alloy illustrating the microstructure thereof, in accordance with the principles of the present disclosure.

Nodular ductile iron alloys having desirable as-cast stiffness and strength are provided. These nodular iron alloys are particularly useful for cast automotive components that undergo large loads and fatigue, and which have advanced designs. The automotive components may be implemented as cast, which saves on additional steps, materials, and costs. In some variations, crankshafts may be created that have integrated as-cast lightening holes in journals and counterweights.

The nodular iron alloys disclosed herein contain iron, carbon, silicon, manganese, copper, chromium, nickel, molybdenum, cobalt, and magnesium, and the nodular iron alloys may also contain phosphorus, sulfur, and one or more rare earth elements.

For example, the nodular iron alloys disclosed herein may include iron, about 2.2 to about 3.2 weight percent (or exactly 2.2-3.2 wt %) carbon, about 1.7 to about 2.3 weight percent (or exactly 1.7-2.3 wt %) silicon, about 0.2 to about 0.6 weight percent (or exactly 0.2-0.6 wt %) manganese, about 0.2 to about 0.6 weight percent (or exactly 0.2-0.6 wt %) copper, about 0.1 to about 0.4 weight percent (or exactly 0.1-0.4 wt %) chromium, about 0.4 to about 0.8 weight percent (or exactly 0.4-0.8 wt %) nickel, about 0.15 to about 0.45 weight percent (or exactly 0.15-0.45 wt %) molybdenum, about 0.2 to about 1.0 weight percent (or exactly 0.2-1.0 wt %) cobalt, and about 0.02 to about 0.06 weight percent (or exactly 0.02-0.06 wt %) magnesium. A carbon equivalent of about 2.8 to about 4.0 weight percent is maintained. The iron may be provided in an amount of at least 90 weight percent. The nodular iron alloys may also include one or more of the following: phosphorus in an amount not exceeding 0.03 weight percent; sulfur in an amount not exceeding 0.02 weight percent; and one or more rare earth elements in an amount not exceeding 0.002 weight percent in total. For example, Table 1 shows an example of the nodular iron alloy, which contains iron, carbon, silicon, manganese, copper, chromium, nickel, molybdenum, cobalt, and magnesium, and which may also contain phosphorus, sulfur, and rare earth element(s). For example, the rare earth element(s) included may be cerium alone or in combination with other rare earth elements.

nodules 12 are present, with iron 14 surrounding the graphic nodules 12. The graphite nodules 12 are of a very fine nodule sizes, where each nodule 12, or a substantial majority, or at least a majority, of the nodules 12 have a diameter in the range of 1 to 5 micrometers. In this example, the iron 14 is present in an amount of greater than 90% of a pearlite microstructure.

The nodular iron 10 may have an as-cast ultimate tensile strength, for example, in the range of 750-960 MPa and a Young's Modulus in the range of 175 to 195 GPa. Accordingly, the nodular iron 10 has sufficient strength for use in high-load automotive components, such as crankshafts, as-cast. The nodular iron 10 may have at least 85% nodularity. The graphite nodules 12 may have a number density of at least 200 nodules per square millimeter.

Figure 2:
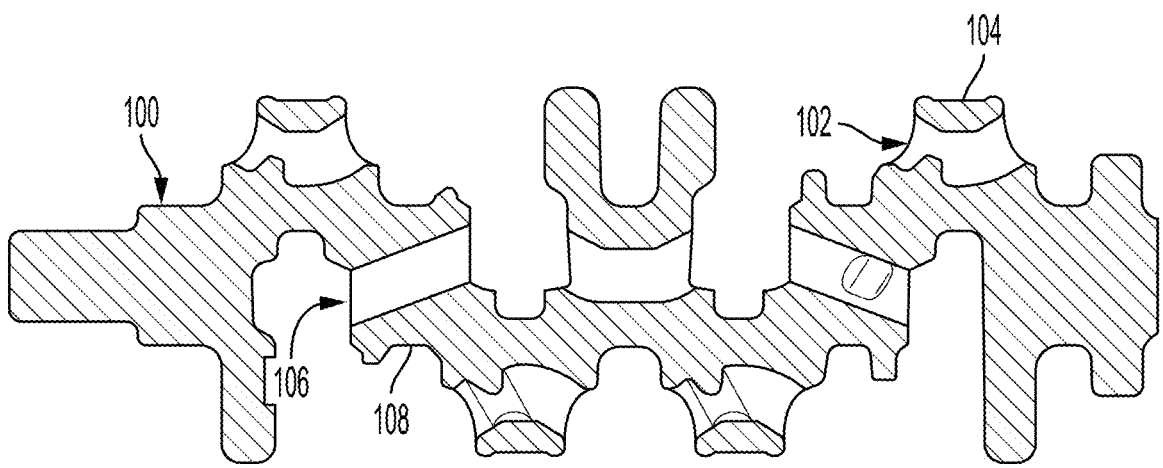
FIG. 2 is a cross-sectional view of a crankshaft formed of a nodular iron alloy in accordance with the principles of the present disclosure.

The nodular iron alloys described herein may be used to manufacture an automotive component, which may be, in some cases, a cast automotive propulsion system component. The automotive components that may be formed with an iron alloy as described herein may include, but are not limited to, crankshafts, transmission shafts, differential carriers, half shafts, axle shafts, and the like. For example, referring to FIG. 2, a crankshaft 100 is illustrated, which is

TABLE 1

Example of a New Nodular Iron Alloy

| C (wt %) | Si (wt %) | Mn (wt %) | P (wt %) | S (wt %) | Cu (wt %) | Cr (wt %) | Ni (wt %) | Mo (wt %) | Co (wt %) | Mg (wt %) | RE (wt %) | Fe |
|---|---|---|---|---|---|---|---|---|---|---|---|---|
| 2.2-3.2 | 1.7-2.3 | 0.2-0.6 | 0-0.03 | 0-0.02 | 0.2-0.6 | 0.1-0.4 | 0.4-0.8 | 0.15-0.45 | 0.2-1.0 | 0.02-0.06 | 0-0.002 | Balance |

In another example, a nodular iron alloy disclosed herein may include about 2.2 weight percent (or exactly 2.2 wt %) carbon, about 2.2 weight percent (or exactly 2.2 wt %) silicon, about 0.3 weight percent (or exactly 0.3 wt %) manganese, about 0.02 weight percent (or exactly 0.02 wt %) phosphorus, about 0.001 weight percent (or exactly 0.001 wt %) sulfur, about 0.3 weight percent (or exactly 0.3 wt %) copper, about 0.2 weight percent (or exactly 0.2 wt %) chromium, about 0.5 weight percent (or exactly 0.5 wt %) nickel, about 0.3 weight percent (or exactly 0.3 wt %) molybdenum, about 0.5 weight percent (or exactly 0.5 wt %) cobalt, about 0.04 weight percent (or exactly 0.04 wt %) magnesium, and about 0.001 weight percent (or exactly 0.001 wt %) rare earth element(s). The balance may be formed of iron. A carbon equivalent of about 2.93 weight percent, or exactly 2.93 weight percent, is maintained. For example, Table 2 shows an example of the nodular iron alloy, which contains iron, carbon, silicon, manganese, phosphorus, sulfur, copper, chromium, nickel, molybdenum, cobalt, magnesium, and one or more rare earth elements.

made of any variation of the nodular iron alloy described herein, and which may be cast. The crankshaft 100 has an advanced design that includes integrated lightening holes 102 formed in rod journals 104 and integrated lightening holes 106 formed in main journals 108. Any other desired lightening holes or complex design features may additional be included. The crankshaft 100 may be cast with the lightening holes 102, 106 using the nodular iron alloys described herein.

The nodular iron alloys described herein may be formed by a method that includes feeding a magnesium-based material into a molten iron alloy through a continuous system at a constant amount. For example, the magnesium-based material may be fed in powder form into the molten iron alloy in a consistent manner (e.g., via a machine and controller), or the magnesium-based material may be a wire that is continuously and consistently fed into the molten iron alloy. A controlled gate may also or alternatively be used to feed the magnesium-based material into the molten iron

TABLE 2

Particular Example of a New Nodular Iron Alloy

| C (wt %) | Si (wt %) | Mn (wt %) | P (wt %) | S (wt %) | Cu (wt %) | Cr (wt %) | Ni (wt %) | Mo (wt %) | Co (wt %) | Mg (wt %) | RE (wt %) | Fe |
|---|---|---|---|---|---|---|---|---|---|---|---|---|
| 2.2 | 2.2 | 0.3 | 0.02 | 0.001 | 0.3 | 0.2 | 0.5 | 0.3 | 0.5 | 0.04 | 0.001 | Balance |

Referring now to FIG. 1, a nodular iron 10 in accordance with the principles of the present disclosure is illustrated. The nodular iron 10 may have a composition, for example, with element ranges shown in Table 1. A plurality of graphite alloy in a consistent manner. The consistency of the application of the magnesium or magnesium alloy into the molten iron alloy results in a nodular iron alloy with the desired nodularity.

The description provided herein is merely exemplary in nature and variations that do not depart from the gist thereof are intended to be within the spirit and scope of the present disclosure. Such variations are not to be regarded as a departure from the spirit and scope of the present disclosure.

What is claimed is:

1. A nodular iron alloy cast automotive component comprising:
an automotive propulsion system component having integrated lightening holes formed through rod journals and main journals therein;
the nodular iron alloy comprising:
iron;
about 2.2 to about 3.2 weight percent carbon;
about 1.7 to about 2.3 weight percent silicon;
about 0.2 to about 0.6 weight percent manganese;
about 0.2 to about 0.6 weight percent copper;
about 0.1 to about 0.4 weight percent chromium;
about 0.4 to about 0.8 weight percent nickel;
about 0.15 to about 0.45 weight percent molybdenum;
about 0.2 to about 1.0 weight percent cobalt; and
about 0.02 to about 0.06 weight percent magnesium, wherein the magnesium comprises a wire or a powder that is continuously and consistently fed into a molten iron alloy, and the continuous and consistent application of the magnesium to the molten iron alloy forms the nodular iron alloy having a nodularity greater than 85% and a Young's modulus in a range of 175 to 195 GPa.

2. The nodular iron alloy cast automotive component of claim 1, wherein the iron is provided in an amount of at least 90 weight percent.

3. The nodular iron alloy cast automotive component of claim 2, further comprising:
phosphorus in an amount not exceeding 0.03 weight percent; and
sulfur in an amount not exceeding 0.02 weight percent.

4. The nodular iron alloy cast automotive component of claim 3, further comprising at least one rare earth element in an amount not exceeding 0.002 weight percent.

5. The nodular iron alloy cast automotive component of claim 4, wherein the nodular iron alloy has an as-cast ultimate tensile strength in a range of 750 to 950 MPa.

6. The nodular iron alloy cast automotive component of claim 5, wherein the iron is present in an amount of greater than 90% of a pearlite microstructure.

7. The nodular iron alloy cast automotive component of claim 6, wherein the iron surrounds a plurality of graphite nodules, and wherein a majority of the graphite nodules of the plurality of graphite nodules have a diameter in a range of 1 to 5 micrometers.

8. The nodular iron alloy cast automotive component of claim 7, wherein the plurality of graphite nodules have a number density of greater than 200 graphite nodules per square millimeter.

9. The automotive component of claim 1, wherein the cast automotive component is a crankshaft for an internal combustion engine.

10. A nodular iron alloy cast automotive propulsion system component consisting essentially of:
about 2.2 to about 3.2 weight percent carbon;
about 1.7 to about 2.3 weight percent silicon;
about 0.2 to about 0.6 weight percent manganese;
0 to about 0.03 weight percent phosphorus;
0 to about 0.02 weight percent sulfur;
about 0.2 to about 0.6 weight percent copper;
about 0.1 to about 0.4 weight percent chromium;
about 0.4 to about 0.8 weight percent nickel;
about 0.15 to about 0.45 weight percent molybdenum;
about 0.2 to about 1.0 weight percent cobalt;
about 0.02 to about 0.06 weight percent magnesium;
about 0.001 to about 0.002 weight percent of at least one rare earth element; and
the balance iron, wherein
the nodular iron alloy cast automotive propulsion system component has integrated lightening holes formed through rod journals and main journals therein, wherein the magnesium comprises a wire or a powder that is continuously and consistently fed into a molten iron alloy, and the continuous and consistent application of the magnesium to the molten iron alloy forms the nodular iron alloy having a nodularity greater than 85%, and wherein the nodular iron alloy has a Young's modulus in a range of 175 to 195 GPa.

11. The nodular iron alloy cast automotive propulsion system component of claim 10, wherein the nodular iron alloy has an as-cast ultimate tensile strength in a range of 750 to 950 MPa.

12. The nodular iron alloy cast automotive propulsion system component of claim 11, wherein the iron is present in an amount of greater than 90% of a pearlite microstructure, wherein the iron surrounds a plurality of graphite nodules, wherein a majority of the graphite nodules of the plurality of graphite nodules have a diameter in a range of 1 to 5 micrometers, and wherein the plurality of graphite nodules have a number density of greater than 200 graphite nodules per square millimeter.

13. The nodular iron alloy cast automotive propulsion system component of claim 12, wherein the nodular iron alloy consists essentially of:
about 2.2 weight percent carbon;
about 2.2 weight percent silicon;
about 0.3 weight percent manganese;
about 0.02 weight percent phosphorus;
about 0.001 weight percent sulfur;
about 0.3 weight percent copper;
about 0.2 weight percent chromium;
about 0.5 weight percent nickel;
about 0.3 weight percent molybdenum;
about 0.5 weight percent cobalt;
about 0.04 weight percent magnesium;
about 0.001 weight percent of at least one rare earth element; and
the balance iron.

14. The nodular iron alloy cast automotive propulsion system component of claim 10, wherein the nodular iron alloy cast automotive propulsion system component is a crankshaft for an internal combustion engine.

* * * * *